Patented Apr. 6, 1937

2,076,484

UNITED STATES PATENT OFFICE 2,076,484

GREEN MONOAZO DYESTUFFS AND A PROCESS FOR THEIR MANUFACTURE

Otto Senn, Basel, Switzerland, assignor to firm Chemical Works formerly Sandoz, Basel, Switzerland No Drawing. Application February 23, 1934, Serial No. 712,682. In Switzerland March 7, 1933

12 Claims. (Cl. 260—92)

It has been found that new very valuable dyestuffs can be obtained by coupling a naphthalene derivative of the general formula

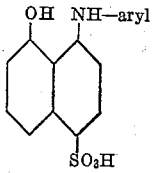

wherein the aryl nucleus may contain substituents such as alkyl, alkoxy, nitro, substituted amino and halogen, with a diazo compound prepared from an o-amino-phenol substituted in the 6-position and containing at least one halogen or nitro, but no free sulphonic group and possessing the general formula:

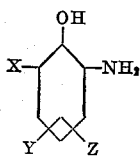

wherein X represents halogen, nitro, alkyl, alkoxy, acylamino, $CONH_2$, $CON(alkyl)_2$, $SO_2NH_2$, $SO_2N(alkyl)_2$, $SO_2N(alkyl-aryl)$ and wherein Y and Z represent hydrogen, nitro, alkyl, alkoxy, acylamino, COOH, $CONH_2$, $CON(alkyl)_2$, $SO_2NH_2$, $SO_2N(alkyl)_2$, $SO_2N(alkyl-aryl)$ group.

As diazo components the following compounds can for example be used: 4:6-dichloroaminophenol, 4:6-dinitroaminophenol, 6-nitroaminophenol, 6-chloroaminophenol, 4-chloro-6-nitroaminophenol, 4-bromo-6-nitroaminophenol, 4-nitro - 6 - chloroaminophenol, 3:4:6 - trichloroaminophenol, 6-methyl-4-nitroaminophenol, 4-nitro-6-methoxyaminophenol, 6-acetylamino-4-chloroaminophenol, 6-chloro-2-aminophenol-4-sulphonamide and its derivatives containing a substituent in the sulphamide group.

As 1-arylamino-8-naphtholsulphonic acids for instance the following compounds can be used: 1-phenylamino-8-naphthol-4-sulphonic acid, 1-(p-tolyl)-amino-8-naphthol-4-sulphonic acid, 1-(p - methoxybenzene) amino-8-naphthol-4-sulphonic acid.

The coupling of the diazo compound with the 1-arylamino-8-naphthol-4-sulphonic acid can be carried out in an alkaline, neutral or slightly acid aqueous solution and preferably at a low temperature.

The dyestuffs can be isolated from their aqueous solutions in the usual manner, for example by salting out. They are in dry state dark powders soluble in water with a blue coloration and dye animal fibres level green to blue-green shades, which, when after-chromed, possess excellent fastness properties.

The dyeings possess especially an excellent fastness to acids, light, milling, carbonization and to sulphur, and are not sensitive towards copper.

The dyeing of the textile fibres can be made in the usual manner, say by the monochrome- or the afterchroming process.

An object of the present invention is, therefore, a process for the manufacture of green monoazo dyestuffs.

Another object of the present invention are the monoazodyestuffs of the general formula:

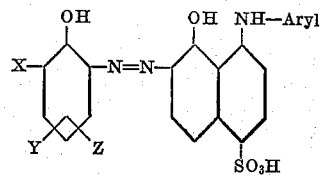

wherein the aryl nucleus may contain substituents such as alkyl, alkoxy, nitro, substituted amino and halogen, and wherein X represents halogen, nitro, alkyl, alkoxy, acylamino, COOH, $CONH_2$, $CON(alkyl)_2$, $SO_2NH_2$ $SO_2N(alkyl)_2$, $SO_2N(alkyl-aryl)$ group and wherein Y and Z represent hydrogen, nitro, alkyl, alkoxy, acylamino, COOH, $CONH_2$, $CON(alkyl)_2$, $SO_2NH_2$, $SO_2N(alkyl)_2$, $SO_2N(alkyl-aryl)$ group.

The following examples, without being limitative, illustrate the present process, the parts being by weight.

Example 1

18.85 parts of 6-nitro-4-chloro-2-aminophenol are dissolved in 500 parts of water in presence of the necessary quantity of sodium hydroxide. To the solution are then added 6.9 parts of sodium nitrite and the compound is diazotized by introducing into the solution at 5° C. 90 parts of hydrochloric acid of 10% strength. This diazo compound is then coupled in an alkaline or neutral or an acetic acid solution with 31.5 parts of 1-phenylamino-8-naphthol-4-sulphonic acid. After the coupling has taken place, the solution is warmed up and the dyestuff precipitated by means of an addition of sodium chloride, filtered and dried.

In dry state the dystuff constitutes a dark powder, soluble in water with a blue coloration, which becomes greener on addition of sodium hydroxide. It is soluble in concentrated sulphuric acid with a violet, in ethanol with a blue coloration.

Its constitution is probably the following:

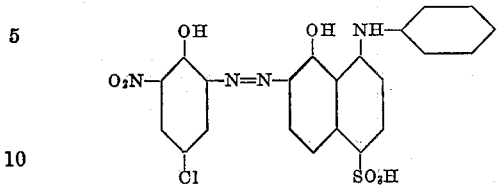

It dyes wool by the monochrome- or afterchroming process into green shades of excellent fastness.

Example 2

The same quantity of the diazo compound prepared as described in Example 1 is coupled with 32.9 parts of 1 (p-tolyl)amino-8-naphthol-4-sulphonic acid and the dyestuff is isolated as described above.

In dry state the dyestuff is a dark powder, soluble in water with a blue coloration that becomes greener on addition of caustic soda. In concentrated sulphuric acid it gives a violet, in ethanol a blue solution. Its constitution is probably the following:

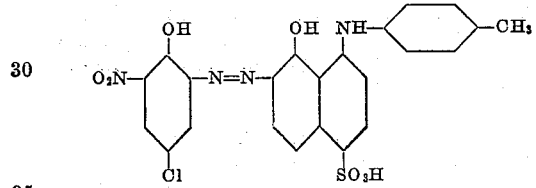

It dyes wool by the monochrome- and afterchroming process into green shades of excellent fastness.

Example 3

17.8 parts of 4,6-dichloroaminophenolchlorhydrate are intimately mixed with water and ice and diazotized by means of an addition of 6.9 parts of sodium nitrite. The diazo compound is then coupled in an alkaline, neutral or acetic acid medium with 31.5 parts of 1-phenylamino-8-naphthol-4-sulphonic acid and after the coupling has taken place, the reaction mixture is warmed up and the dyestuff precipitated by means of common salt.

In dry state the dyestuff is a dark powder, soluble in water with a blue, in dilute caustic soda solution with a red, in concentrated sulphuric acid with a grey-violet and in ethanol with a red-blue coloration. Its probable constitution is:

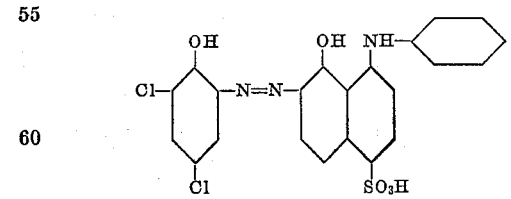

It dyes wool by the monochrome- or the afterchroming process into bluish-green shades of excellent fastness.

Example 4

19.9 parts of 4,6-dinitro-2-aminophenol are diazotized in the usual way with 6.9 parts of sodium nitrite and coupled in an alkaline, acetic acid or neutral solution with 1-phenylamino-8-naphthol-4-sulphonic acid. The dyestuff is then isolated from its solution in the usual way. It constitutes in dry state a dark powder, soluble in water with a blue coloration that becomes grey-blue on addition of caustic soda, soluble in sulphuric acid with a red and in ethanol with a blue coloration. Its probable constitution is the following:

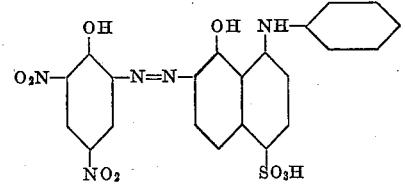

It dyes wool by the monochrome- or the afterchroming process into yellowish-green shades of excellent fastness.

What I claim is:—

1. A process for the manufacture of green chromatable monoazo dyestuffs, comprising coupling a naphthalene derivative of the general formula

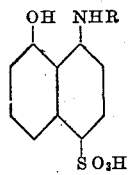

wherein R represents a member of the group consisting of phenyl, alkylphenyl, alkoxyphenyl and halogenophenyl with a diazo compound prepared from an o-aminophenol of the benzene series of the general formula

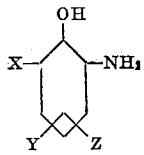

wherein X represents a group selected from the class consisting of halogen, nitro, alkyl, alkoxy and acylamino groups, Y represents a substituent selected from the group consisting of hydrogen, halogen, nitro, COOH, $SO_2NH_2$, $SO_2N(alkyl)_2$ and $SO_2$—N(alkyl) (aryl), and Z represents a member of the group consisting of hydrogen, halogen, nitro, COOH, $SO_2NH_2$, $SO_2N(alkyl)_2$, $SO_2N(alkyl)$ (aryl), and wherein when X represents an alkyl, alkoxy or acylamino group Y represents a substituent selected from the class consisting of nitro and halogen.

2. A process for the manufacture of green chromatable monoazo dyestuffs, comprising coupling a naphthalene derivative of the general formula

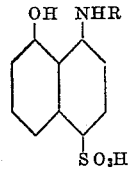

wherein R represents a member of the group consisting of phenyl, alkylphenyl, alkoxyphenyl and halogenophenyl, with a diazo compound prepared from an o-aminophenol of the benzene series of the general formula

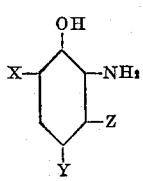

wherein X represents a group selected from the class consisting of halogen, nitro, alkyl, alkoxy and acylamino groups, Y represents a substituent selected from the group consisting of hydrogen, halogen, nitro, COOH, SO₂NH₂, SO₂N(alkyl)₂ and SO₂—N(alkyl)(aryl), and Z represents a member of the group consisting of hydrogen, halogen, nitro, COOH, SO₂NH₂, SO₂N(alkyl)₂, SO₂N(alkyl)(aryl), and wherein when X represents an alkyl, alkoxy or acylamino group Y represents a substituent selected from the class consisting of nitro and halogen.

3. A process for the manufacture of green chromatable monoazo dyestuffs, comprising coupling a naphthalene derivative of the general formula

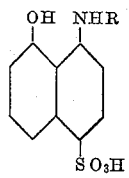

wherein R represents a member of the group consisting of phenyl, alkylphenyl, alkoxyphenyl and halogenophenyl, with a diazo compound prepared from an o-aminophenol of the benzene series of the general formula

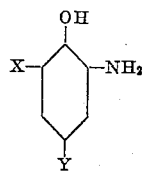

wherein X represents a group selected from the class consisting of halogen, nitro, alkyl, alkoxy and acylamino groups, and Y represents a substituent selected from the group consisting of hydrogen, halogen, nitro, COOH, SO₂NH₂, SO₂N(alkyl)₂ and SO₂—N(alkyl)(aryl), wherein when X represents an alkyl, alkoxy or acylamino group Y represents a substituent selected from the class consisting of nitro and halogen, and which when both X and Y represent Cl may contain a further Cl in the 3-position.

4. A process for the manufacture of a green chromatable monoazo dyestuff, comprising coupling 1-phenylamino-8-naphthol-4-sulphonic acid with the diazo compound from 6-nitro-4-chloro-2-aminophenol.

5. A process for the manufacture of a green chromatable monoazo dyestuff, comprising coupling 1-phenylamino-8-naphthol-4-sulphonic acid with the diazo compound from 4,6-dichloro-2-aminophenol.

6. A process for the manufacture of a green chromatable monoazo dyestuff, comprising coupling 1-phenylamino-8-naphthol-4-sulphonic acid with the diazo compound from 4,6-dinitro-2-aminophenol.

7. The dyestuffs of the general formula

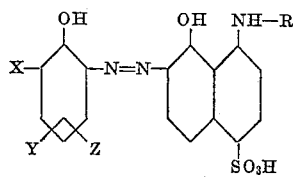

wherein R represents a member of the group consisting of phenyl, alkylphenyl, alkoxyphenyl and halogenophenyl, X represents a group selected from the class consisting of halogen, nitro, alkyl, alkoxy and acylamino groups, Y represents a substituent selected from the group consisting of hydrogen, halogen, nitro, COOH, SO₂NH₂, SO₂N(alkyl)₂ and SO₂—N(alkyl)(aryl), and Z represents hydrogen, halogen, nitro, COOH, SO₂NH₂, SO₂N(alkyl)₂, SO₂N(alkyl)(aryl), and wherein when X represents an alkyl, alkoxy or acylamino group Y represents a substituent selected from the class consisting of nitro and halogen, which dyestuffs constitute in dry state dark powders soluble in water with a blue coloration and which dye animal fibres fast green shades by the monochrome- and afterchroming process.

8. The azodyestuffs of the general formula

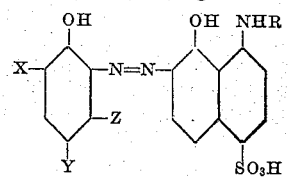

wherein R represents a member of the group consisting of phenyl, alkylphenyl, alkoxyphenyl and halogenophenyl, X represents a group selected from the class consisting of halogen, nitro, alkyl, alkoxy and acylamino groups, Y represents a substituent selected from the group consisting of hydrogen, halogen, nitro, COOH, SO₂NH₂, SO₂N(alkyl)₂ and SO₂—N(alkyl)(aryl), and Z represents hydrogen, halogen, nitro, COOH, SO₂NH₂, SO₂N(alkyl)₂, SO₂N(alkyl)(aryl), and wherein when X represents an alkyl, alkoxy or acylamino group Y represents a substituent selected from the class consisting of nitro and halogen, which dyestuffs constitute in dry state dark powders soluble in water with a blue coloration and which dye animal fibres fast green shades by the monochrome- and afterchroming process.

9. Azodyestuffs having the formula

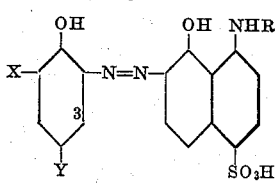

wherein R represents a member of the group consisting of phenyl, alkylphenyl, alkoxyphenyl and halogenophenyl, X represents a group selected from the class consisting of halogen, nitro, alkyl, alkoxy and acylamino groups, and Y represents a substituent selected from the group consisting of hydrogen, halogen, nitro, COOH, SO₂NH₂, SO₂N(alkyl)₂ and SO₂—N(alkyl)(aryl), wherein when X represents an alkyl, alkoxy or acylamino group Y represents a substituent selected from the class consisting of nitro and halogen, and which when both X and Y represent Cl may contain a further Cl in the 3-position indicated, which dyestuffs constitute in dry state dark powders soluble in water with a blue coloration and which dye animal fibers fast green shades by the monochrome- and afterchroming process.

10. The dyestuff of the formula:

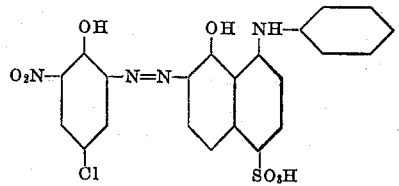

which is in dry state a dark powder, soluble in water, with a blue coloration that becomes greener on addition of sodium hydroxide, soluble in concentrated sulphuric acid with a violet and in ethanol with a blue coloration and which dyes wool fast green shades by the monochrome- and afterchroming process.

11. The dystuff of the formula

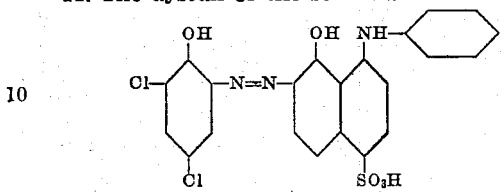

which is in dry state a dark powder, soluble in water with a blue, in dilute caustic soda with a red, in concentrated sulphuric acid with a grey-violet and in ethanol with a red-blue coloration and which dyes wool fast bluish-green shades by the monochrome- and afterchroming process.

12. The dyestuff of the formula:

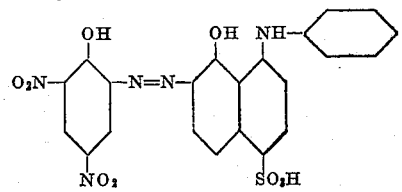

which is in dry state a dark powder, soluble in water with a blue coloration that becomes grey-blue on addition of caustic soda, soluble in sulphuric acid with a red and in ethanol with a blue coloration and which dyes wool fast yellowish green shades by the monochrome- and afterchroming process.

OTTO SENN.